Figure 1:
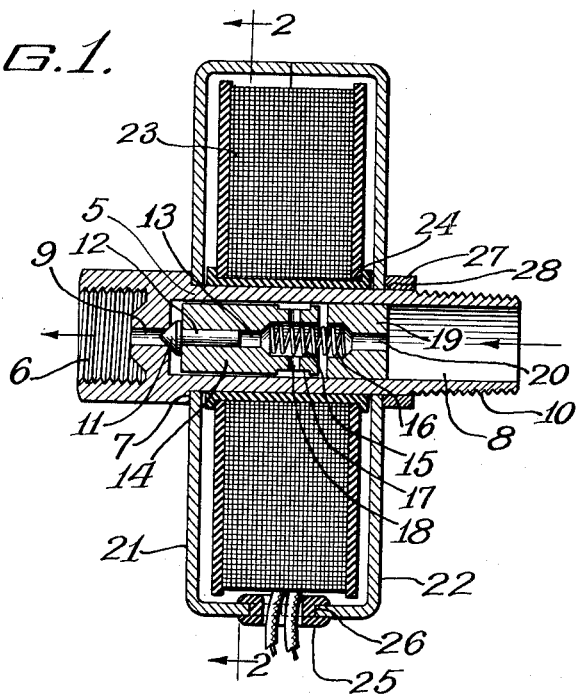

March 27, 1951

H. G. WASSERLEIN 2,546,325

THROUGH FLOW TYPE SOLENOID VALVE

Filed June 28, 1945

Inventor:
Henry G. Wasserlein
By Leek Wells
Attorney

Patented Mar. 27, 1951

2,546,325

UNITED STATES PATENT OFFICE 2,546,325

THROUGH FLOW TYPE SOLENOID VALVE

Henry G. Wasserlein, Park Ridge, Ill., assignor to Phillips Control Corporation, Chicago, Ill., a corporation of Illinois Application June 28, 1945, Serial No. 602,094

1 Claim. (Cl. 137—139)

The present invention relates to electrically operated valves and more particularly to the type of solenoid valve known as through flow valves. It is the principal purpose of my invention to provide a novel simplified valve construction whereby sticking of the valve is avoided.

It is a further purpose of my invention to provide a valve of this character wherein the apparent magnetic faults are overcome substantially by utilizing structural features that reduce magnetic losses to a minimum. My invention contemplates a through flow valve wherein a piece of nonmagnetic tubing such as a brass tube is adapted to be inserted in the conduit through which the liquid to be controlled flows. This brass tube provides the means for supporting and holding all the parts of the valve including the magnetic materials. The operative parts of the valve are so mounted with respect to the brass tube to obtain the advantages herein outlined.

The detailed construction and advantages of the valve will appear more fully from the following description and accompanying drawings wherein a preferred form of the invention is disclosed. It should be understood however, that the drawings and description are illustrative only and are not to be taken as limiting the invention except insofar as it is limited by the claim.

Figure 2:
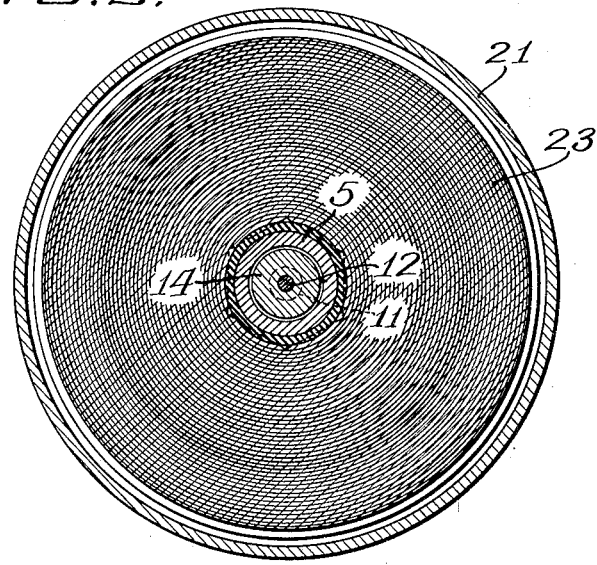

In the drawings:

Figure 1 is a longitudinal sectional view through a valve embodying my invention; and Figure 2 is a sectional view taken on the line 2—2 of Figure 1.

In the drawings the valve is shown as including a tubular member 5 which is made of brass or other suitable nonmagnetic material. It may be made, for example, from a hexagon rod. One end is provided with an interior thread at 6. This end is left full size but the principal part of the rod is cut down to a smaller diameter leaving a shoulder at 7. The rod is bored to provided a valve chamber 8 and the outlet 9 from the valve chamber is drilled from the bottom of the chamber through to the threaded part 6. Pipe threads 10 are cut on the reduced end of the brass rod.

The valve proper comprises a molded needle valve 11 which is cone shaped to seat in the opening 9. The valve 11 has a stem 12 which is retained in a bore 13 of a solenoid core 14. The solenoid core is made slightly smaller in diameter than the diameter of the bore 8 to allow liquid to flow freely between the core and the tube 5. The core at its end opposite the valve 11 has an enlarged bore 15 which seats a spring 16. Concentric with the enlarged bore there is a neck portion 17 provided on the core 14. Liquid passages 18 are provided through the neck portions 17. The spring 16 seats in a stop 19 which has a liquid passage 20 therethrough. The stop 19 is knurled on its exterior surface so as to have a maximum diameter such that it can be driven tightly into the bore 8 in assembly. It is firmly held in place due to another feature of the present construction as well as the binding due to the drive fit.

The stop 19 and the core 14 desirably are constructed of a relatively low cost magnetic material such as cold drawn steel. These parts are nickle plated to protect them against corrosion. The spring 16 is preferably made of stainless steel wire.

The exterior parts of the valve comprise two cups 21 and 22 having central apertures to receive the brass tube 5. These cups are of a suitable magnetic material such as cold rolled steel and are a slip fit on the brass tube. A solenoid coil 23 has its spool 24 fitting on the tube 5 inside the cups 21 and 22. The leads for the coil 23 extend through a rubber grommet 25 which fits in an aperture 26 formed by cutting out two semicircular portions of the rims of the cups 21 and 22.

The final assembly of the parts on the tube 5 is completed by driving a ring 27 over the end of the tube. The ring preferably is made of a seamless tubing and is chamfered at 28. The function of the ring 27 is to serve as a binding means for tightly securing the cups 21 and 22 against each other and against the shoulder 7. The ring 27 furthermore swedges the tube inward slightly so as to cause it to bind on the stop 19 and thus lock the stop in position against any displacement due to the hammering of the core 14. This matter of assembly has the distinct advantage of avoiding the necessity for threading the tube 5 or utilizing spilt clamps which are expensive and troublesome. Furthermore the single retaining ring 27 serves to lock both the valve assembly and the solenoid assembly in place. It is possible with this construction to utilize a relative thin wall for the tube 5 thereby reducing the gap in the magnetic circuit between the cups 21 and 22 and the inner elements 14 and 19.

The operation of the valve is such that there is very little likelihood of its sticking or becoming inoperative. The valve 11 is made of relatively soft material. The liquid which flows past the valve flows around the outside of the core 14 thus serving as a lubricant to prevent the core from becoming stuck. The liquid can flow through the opening 18 in and around the spring 16 and then through the opening 20 in the stop 19. The friction of the core 14 against the walls of the tube 5 is reduced to a minimum because of the substantial clearance between the core and the tube. Furthermore the position of the valve stem 12 and of the spring 16 are such that they aid in keeping the core in line. Wear on the valve or valve seat does not affect the operation of the valve except as it may prevent proper seating. The entire construction is such as to eliminate costly operations either in the manufacture or assembly of the parts.

Having thus described my invention I claim:

In a through flow valve of the character described comprising a hollow tube threaded for pipe connections at its ends and having the greater portion of its length reduced in circumference with a shoulder located between the greater and lesser circumferences, a solenoid surrounding and fitting over said tube, a two part magnetic housing for the solenoid fitting over said tube at its lesser circumference and abutting the shoulders, a partition in one end of said tube apertured and seated for a valve, a plunger stop of magnetic material tightly fixed in the tube end opposite said partition, a recessed plunger of magnetic material slidably positioned between said partition and said plunger stop and having valve means fixed to the end contacting said partition, a ring swedged over the end of the tube having the lesser circumference and compressing said tube inwardly against the fixed plunger stop and tightly butting said solenoid housing against said shoulder of said tube.

HENRY G. WASSERLEIN.

REFERENCES CITED

The following references are of record in the file of this patent:

UNITED STATES PATENTS

| Number | Name | Date |
| --- | --- | --- |
| Re. 17,689 | Hibbard | June 3, 1930 |
| 204,033 | Hallberg | May 21, 1878 |
| 1,430,263 | Sage | Sept. 26, 1922 |
| 1,481,341 | Bersted | Jan. 22, 1924 |
| 1,622,672 | Raymond | Mar. 29, 1927 |
| 2,121,657 | Fisher | June 21, 1938 |
| 2,155,358 | Cyr | Apr. 18, 1939 |
| 2,262,842 | Goepfrich | Nov. 18, 1941 |
| 2,267,515 | Wilcox | Dec. 23, 1941 |
| 2,279,243 | Parsons | Apr. 7, 1942 |
| 2,289,310 | Steel | July 7, 1942 |
| 2,360,945 | Garner | Oct. 24, 1944 |
| 2,391,129 | Chambers | Dec. 18, 1945 |

FOREIGN PATENTS

| Number | Country | Date |
| --- | --- | --- |
| 688,114 | France | May 6, 1930 |